H. P. KRAFT.
TIRE VALVE.
APPLICATION FILED DEC. 17, 1914.

1,322,583.

Patented Nov. 25, 1919.

WITNESSES:
René Bruine
Fred White

INVENTOR:
Henry P. Kraft,
By Attorneys,
Fraser Turk & Myers

UNITED STATES PATENT OFFICE.

HENRY P. KRAFT, OF RIDGEWOOD, NEW JERSEY.

TIRE-VALVE.

1,322,583. Specification of Letters Patent. Patented Nov. 25, 1919.

Application filed December 17, 1914. Serial No. 877,791.

*To all whom it may concern:*

Be it known that I, HENRY P. KRAFT, a citizen of the United States of America, residing in Ridgewood, in the county of Bergen and State of New Jersey, have invented certain new and useful Improvements in Tire-Valves, of which the following is a specification.

This invention relates to valves, and is particularly applicable to tire valves, although it may be used in connection with other valves if desired.

The invention is particularly directed to that type of valve in which the casing is provided with an internal seat and a check below the seat which is ordinarily normally pressed forwardly by a spring. In this type of a valve, of which the well-known Schrader valve is an example, the dimensions of the valve are quite small and the packing carried by the check is by reason of its small dimensions more or less perishable. It is desirable in shipping such valves that the check should be held away from its seat until the valve is placed in use, and for some purposes it is also desirable that after the check shall have performed its function in the inflation of the tube or other device, the check shall be maintained away from its seat, the actual seal in this case being made by a cap or other member which forms a leak-tight joint with the upper part of the shell.

According to the present invention I provide a valve cap of common exterior form which shall perform these functions, such valve cap being adapted to take the place of the ordinary valve caps now in use. To this end I construct a valve cap with an internal washer as heretofore, and I also preferably provide a non-compressible part extending into the valve casing, and adapted to contact with the usual deflating pin. The invention also includes certain other features of improvement which will be hereinafter more fully pointed out.

Referring to the accompanying drawings which illustrate several forms of the invention,—

Figure 1:
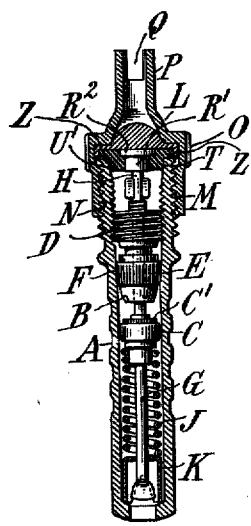
Figure 1 is a central vertical section of a tire valve showing the improved cap in place.

Referring to the drawings, let A indicate the casing of a tire valve of the Schrader type, which casing contains the valve mechanism comprising usually a seat B and check or valve proper C which carries a seating face or packing C' usually constructed of soft rubber. The seat is swiveled to a screw-threaded plug D which presses the seat downwardly until the packing E contacts with the tapered shoulder F, thus making a tight joint around the seat. The check or valve proper is usually mounted on a pin G which extends through it, both above and below the check, the upper part of the pin terminating at H and being adapted to be used for deflating purposes, and the lower part passing through a spring J and spring holder or guide K. The function of the spring is to normally press the check C against its seat, and to restore it after it has been depressed in the act of pumping or otherwise.

According to the present invention, I provide a cap L which preferably is adapted to screw on the exterior of the valve, in which case the cap is formed with interior threads M engaging exterior threads N on the top of the valve casing. The cap is usually provided with a knurled portion O adapted to give a finger-hold in screwing it down, and a projection P adapted to enter the casing and usually provided with screw driver notches Q designed to engage the plug D for the purpose of screwing or unscrewing it. In the ordinary construction of Schrader cap, the latter is provided with a packing washer adapted to contact with the top of the valve casing and produce an additional closure, so that if there is leakage past the check, the air cannot escape from the casing. This packing has heretofore been constructed in such manner that when the cap is screwed home it does not contact with the upper end H of the pin G. By the present invention the cap is so constructed as to engage the pin G and to press it so as to force the check C away from its seat. By this means the soft rubber packing C' may be held away from the seat, thus avoiding any indentation or pressure upon the packing before the valve is placed into use. Also, when the valve is in use the check is effective during the operation of pumping, but as soon as the valve cap is applied, it is depressed, so that all strain and pressure is taken from the packing, a tight joint being then made by the valve cap packing which acts as a seal for the valve.

To these ends the packing I or a part carried by it is lowered sufficiently to engage the end H of the pin G. Preferably, in order to avoid wear on the packing, the latter is provided with an abutment R' which may be in the form of a metal rivet or the like, flanged at $R_2$ to insure against its dropping out of the packing. In order to avoid rotation of the packing when the cap is screwed home, the latter may be carried in a packing holder S formed of metal and fitting the contacting parts of the cap in a sufficiently loose manner to permit relative rotation of the two. The packing holder S may have an upper protuberance or bearing face S' which enters a recess $S_2$ formed in the cap, thus centering the packing and lessening the friction between the parts.

Figure 2:
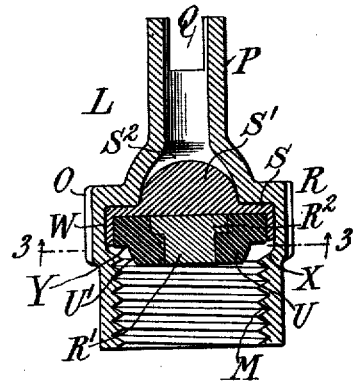
Fig. 2 is an enlarged sectional view of the cap.

An important feature of the invention is the provision of means for lessening or avoiding the escape of air from the casing during the period when the check is depressed and before the cap is fully screwed home. In the construction shown in Figs. 1 and 2, this is accomplished by forming tapering parts upon the valve casing or packing, or preferably upon both parts, as shown. The interior of the casing is shown as provided with a tapered seat T, and the packing is shown as provided with a depending portion U which is preferably also tapered as shown at U'. When the cap is applied, the tapered packing contacts with the tapered seat before the cap is fully screwed on, with the result that leakage from the casing is much lessened or prevented. A tapered construction is preferred in that it permits a movement of the valve cap of considerable length after the packing contacts with its seat, without unduly distorting the packing. The parts may be so constructed that a tight joint between the cap and casing is made before the check is opened. The tapered packing and seat also provide an extremely efficient closure, securing a tight joint without undue pressure upon the packing, and increasing the life of the latter in use.

Figure 4:
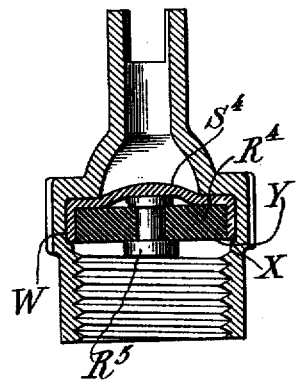
Fig. 4 is a view similar to Fig. 2, showing a modified form of cap.
Figure 3:
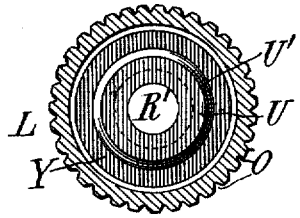
Fig. 3 is a cross-section taken on the line 3—3 in Fig. 2.

In Fig. 4 the cap packing is shown as a plain disk $R_4$, and the abutment $R_5$ is constructed as a double-headed rivet. The packing carrier $S_4$ is formed of sheet metal as shown. In this construction the packing may be made of high degree of compressibility, so as to minimize or prevent the leakage of air when the check is opened and before the cap is screwed home.

Figure 5:
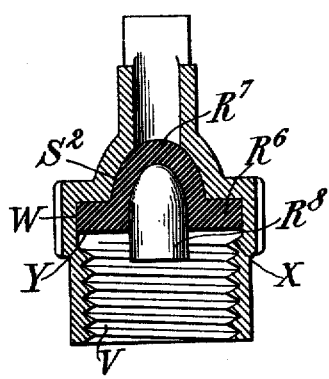
Fig. 5 is a similar view showing a further modification.

In Fig. 5 the packing $R_6$ is made in dome shape, its dome $R_7$ entering into the recess $S_3$, as shown. The abutment $R_8$ may be of metal, having its top rounded to fit the interior of the dome of the packing, and being vulcanized or cemented thereto to hold it in place.

It will be observed in all the constructions shown, that the valve cap is provided in its body portion above its screw threads M, with a recess W which receives the edges of the carrier or packing, thus holding the same in place, the shoulder X below the recess preventing the downward escape of the packing. It will also be observed that in each instance the packing is provided with an annular face Y which directly contacts with the upper edge Z of the valve casing, thus forming a seal with the casing.

While I have shown and described several forms of the invention, it is to be understood that I do not wish to be limited thereto, since various changes may be made therein without departing from the invention.

What I claim is:—

1. A valve cap having a packing of compressible material adapted to make a tight joint with the top of the valve casing, said packing having a portion for depressing the valve stem.

2. A valve cap having a packing of compressible material contacting with the top of a valve casing, and an abutment carried by said packing for depressing a valve stem.

3. A valve cap having a packing contacting with the top of a valve casing, and an abutment carried by said packing for depressing a valve stem, said abutment comprising a rivet-like member carried by said packing.

4. A valve cap having a packing provided with a plurality of faces, one of which is adapted to engage the top of a valve casing and the other of which is adapted to enter said casing and make a tight joint with a seat therein.

5. A valve cap having a packing provided with a plurality of faces, one of which is adapted to engage the top of a valve casing and the other of which is adapted to enter said casing and make a tight joint with a seat therein, said last-named face being tapered.

6. The combination of a valve casing having an internal seat at its end and a valve cap having a recess in its body portion and a packing of compressible material carried in said recess, said packing having a depending portion adapted to enter said casing, said portion being compressed against said seat.

7. The combination of a valve casing having an internal seat at its end and a valve cap having a recess in its body portion and a packing carried in said recess, said packing having a depending portion adapted to enter said casing and be compressed against said seat, and said depending portion being tapered.

8. The combination of a valve casing having its upper end internally screw-threaded and being internally tapered above such thread and a valve cap having a recess in its body portion, a packing carried substantially entirely in said recess and having a depending portion adapted to enter said valve casing and engage said tapered portion of such casing.

9. The combination of a valve casing having its upper end internally screw-threaded and being internally tapered above such thread and a valve cap having a recess in its body portion, a packing carried substantially entirely in said recess and having a tapered depending portion adapted to enter said valve casing and engage said tapered portion of such casing.

10. A valve cap having a recess and a packing lying wholly within the recess and being swiveled therein, said packing having a depending portion adapted to contact with a valve casing.

11. A valve cap having a recess and a packing lying wholly within the recess and being swiveled therein, said packing having a depending portion adapted to contact with a valve shell, and said depending portion being tapered.

12. A valve cap having a packing of compressible material adapted to seal the end of a valve casing, said cap having means for supporting the packing and said packing having a portion supported solely by the packing for depressing the valve stem.

13. A valve cap having a packing of compressible material adapted to seal the end of a valve casing, said cap having means for supporting the packing and said packing having an abutment supported solely by the packing for depressing the valve stem.

14. The combination of a valve casing having two seats, one at the top and the other an internal seat, and a valve cap having a packing formed with two engaging faces, one adapted to engage the top seat of the valve and the other adapted to enter the valve and contact with the second seat.

In witness whereof, I have hereunto signed my name in the presence of two subscribing witnesses.

HENRY P. KRAFT.

Witnesses:
E. V. MYERS,
FRED WHITE.